United States Patent [19]

Phaal

[11] Patent Number: 5,450,408
[45] Date of Patent: Sep. 12, 1995

[54] METHOD OF ASCERTAINING TOPOLOGY FEATURES OF A NETWORK

[75] Inventor: Peter Phaal, Bradley Stoke, England

[73] Assignee: Hewlett-Packard Company, Palo Alto, Calif.

[21] Appl. No.: 769,936

[22] Filed: Sep. 30, 1991

[30] Foreign Application Priority Data

Sep. 28, 1990 [EP]  European Pat. Off. ............ 90310699
Feb. 14, 1991 [EP]  European Pat. Off. ............ 91301204

[51] Int. Cl.$^6$ .............................................. H04J 3/02
[52] U.S. Cl. ................................ 370/85.13; 370/94.3; 340/825.06; 340/825.02
[58] Field of Search ................. 370/85.13, 85.1, 85.12, 370/16, 85.4, 94.1, 94.3, 92, 85.14, 60, 60.1, 94.2; 340/825.08, 825.07, 825.06, 825.16, 825.01, 825.02, 825.17, 825.03; 395/200, 325, 375

[56] References Cited

U.S. PATENT DOCUMENTS

| 5,042,027 | 8/1991 | Takase et al. | 370/54 |
| 5,079,765 | 1/1992 | Nakamura | 370/85.13 |
| 5,088,091 | 2/1992 | Schroeder et al. | 370/85.13 |
| 5,109,483 | 4/1992 | Bartz et al. | 395/200 |
| 5,150,360 | 9/1992 | Perlman et al. | 370/94.3 |
| 5,189,414 | 2/1993 | Tawara | 370/85.13 |
| 5,218,603 | 6/1993 | Watanable | 370/85.13 |

FOREIGN PATENT DOCUMENTS 0265106  4/1988  European Pat. Off. .

OTHER PUBLICATIONS

"Management of Sampled Real-Time Network Measurements" Paul D. Amer and Lillian N. Cassel, IEEE 1989.

"The Monitoring of Inter-process Communications in Distributed Systems", U. De Calrini et al., Future Generations Computer Systems, 5(1989-90) Jan., No. 4.

"A Multi-purpose, Distributed LAN Traffic Monitoring Tool" D. Ritter, et al. 8302 IEEE Network Jul. 1987, No. 3, pp. 32-39.

"A Distributed Approach to LAN Monitoring Using Intelligent High Performance Monitors" M. Soha 8302 IEEE Network Jul. 1987, No. 3 pp. 13-19.

"A Monitor Tool for a Network Based on the Cambridge Ring" 8239 Software Practice & Experience, S. Vassiliades et al. Jul. 1986, No. 7, pp. 671-687.

Primary Examiner—Douglas W. Olms
Assistant Examiner—Dang Ton

[57] ABSTRACT

A method is provided for ascertaining topology features of a network comprising a plurality of sub-networks, spanning devices interconnecting the sub-networks, and stations operative to source and/or sink traffic to/from the sub-networks. The traffic is in the form of discrete message packets each including source and destination information. Traffic on each of the sub-networks is monitored by a respective monitoring device and a partial traffic matrix is built up for each sub-network. These partial traffic matrices are then analyzed by a central processing station to determine, for example, the association of stations within the with sub-networks, and the interconnection of sub-networks by spanning devices.

16 Claims, 11 Drawing Sheets

| SUB - NETWORK TRAFFIC MATRIX | | DESTINATION STATION | | | |
|---|---|---|---|---|---|
| | | 11A | 11B | 11C - - - - - - | 11N |
| SOURCE STATION | 11A | – | 21 | 9 | 65 |
| | 11B | 42 | – | 100 | 100 |
| | 11C | 69 | 84 | – | 15 |
| | ⋮ | | | | |
| | 11N | 150 | 29 | 75 | – |

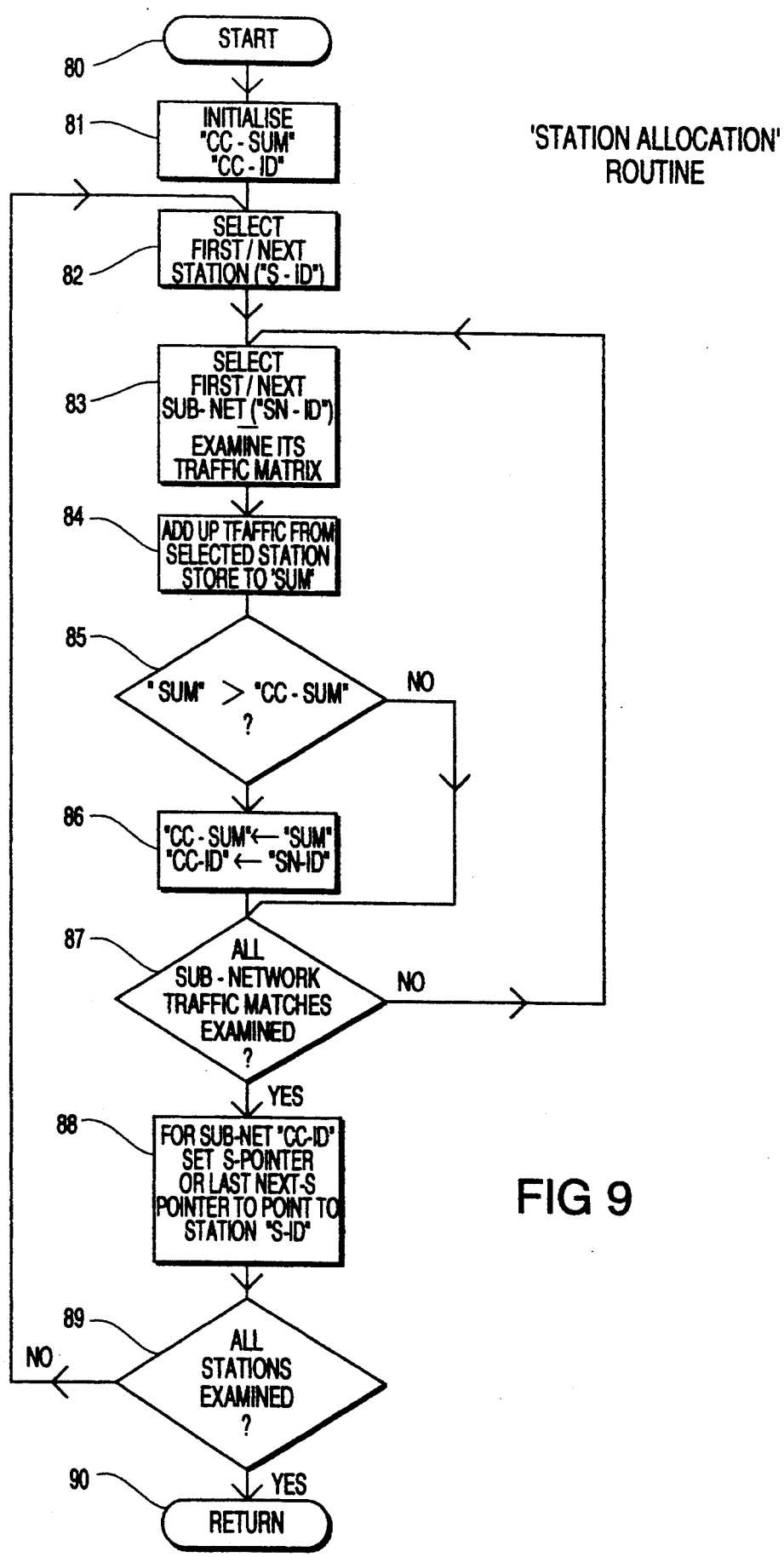

METHOD OF ASCERTAINING TOPOLOGY FEATURES OF A NETWORK

FIELD OF THE INVENTION

The present invention relates to a method of ascertaining topology features of a network of the type comprising a plurality of sub-networks, spanning devices interconnecting the sub-networks, and stations operative to source and/or sink traffic to/from the sub-networks, the traffic being in the form of discrete message packets each including source and destination information.

BACKGROUND OF THE INVENTION

Networks of the aforesaid type are well known, their spanning devices serving to isolate local traffic (that is, traffic sourcing from, and destined for, stations on the same sub-network) to the sub-network concerned, at least to some degree. Examples of such networks are:
 (a) bridged Ethernets where stations, identified by Ethernet addresses, are connected to sub-networks (also termed logical segments) which are interconnected by spanning devices in the form of bridges operating at level 2 of the seven-layer OSI Reference Model; and
 (b) Internet networks where stations identified by "ip" addresses are connected to "ip" sub-networks which are interconnected by spanning devices in the form of routers or gateways operating at level 3 of the seven-layer OSI Reference Model.

Knowledge of topological features of such networks (for example, the connection arrangement of stations to sub-networks and the interconnection of sub-networks by spanning devices) is of importance in monitoring and optimizing the performance of the network and in planning for its expansion to cope with increased demand. However, such knowledge is frequently difficult to ascertain, particularly with large networks. For example, keeping up-to-date plans of the network by recording every change made, is not only time-consuming but is, in reality, a virtually impossible task to carry through with complete accuracy; in addition, such plans can only indicate the intended connection state of the network and cannot take account of the failure of network elements such as the simple disconnection of a station from its sub-network. Physical inspection of a network to ascertain its topology is also very difficult since much of the network may be hidden beneath flooring or located at remote sites.

In the case of a network made up of a single sub-network, it is possible to ascertain which stations are connected to the subnetwork simply by monitoring the traffic on the sub-network; all stations sourcing traffic are obviously connected to the sub-network as there is no other source of traffic outside the sub-network. However, where the network comprises several sub-networks interconnected by spanning devices, it is no longer possible to make such simple deductions as traffic appearing on any one particular sub-network might have originated on another sub-network.

SUMMARY OF THE INVENTION

It is an object of the present invention to provide a relatively simple method for ascertaining topology features of a network that includes a plurality of sub-networks.

The present invention provides a method of ascertaining topology features of a network of the aforesaid type. The traffic on some of the sub-networks is monitored to derive data related to the amounts and origins of the traffic. The data is then processed to determine the topology features of the network.

The monitoring step utilizes a monitoring device on each sub-network concerned. Such a device may be a stand-alone device or part of a spanning device or station connected to the sub-network. Each monitoring device is preferably operative to collect both source and destination information in respect of traffic on the sub-network and this information is then used to generate a partial traffic matrix, that is, a correlation between source stations and destination stations for the traffic seen on the sub-network concerned. Preferably, therefore, the data passed by the monitoring step to the processing step will be in the form of partial traffic matrices for all the relevant sub-networks. However, it should be understood that the processing step, depending on what topological features are to be ascertained, may not require all the data contained in such partial traffic matrices and the present invention should therefore not be taken as limited to the provision of the necessary data to the processing step in the form of partial traffic matrices.

The source information in each message packet will generally only provide an indication of the originating station, although in certain networks, sub-network identification is also carried in the source information. In the former case, the method of the present invention can be used to ascertain to which sub-network a selected station is connected. This is achieved by having the monitoring step determine the amount of traffic originating from the selected station that is carried by each said sub-network. The processing step then determines the sub-network carrying the most traffic from the selected station. This sub-network is taken as the one to which said selected station is connected. This process can then be repeated for each station to build up a complete picture of the connection of stations to sub-networks.

The method of the present invention can also be used to ascertain whether a first sub-network is directly connected by a spanning device to a second sub-network; this is done by comparing, for some or all of the components of traffic originating on the first sub-network, the amounts of that traffic seen on the second sub-network with the amounts of that traffic seen on all the other sub-networks (that is, other than the first and second sub-networks). In particular, three different methods for testing for a spanning device will be described in detail herein.

In a preferred implementation of the invention, traffic information on each sub-network is collected locally by a sampling monitoring device which transmits sampled data back to a central processing station. The processing station derives partial traffic matrices for all the monitored sub-networks and then processes the data contained in the traffic matrices in accordance with the methods of the invention. In carrying out this processing, the processing station effects comparisons between traffic flows by using hypothesis testing in view of the sampled nature of the data provided to it.

A suitable sampling monitoring device for use in implementing the method of the present invention is described and claimed in our co-pending European Patent Application No. 90310699.5 filed 28th Sep. 1990.

The partial traffic matrices used by the processing station for deriving topology features of the network can, of course, be obtained in other ways such as, for example, by monitoring devices which derive and store these partial traffic matrices themselves, the partial traffic matrices then being collected and passed to the processing station.

BRIEF DESCRIPTION OF THE DRAWINGS

A method, according to the invention, of ascertaining topology features of a network will now be described by way of non-limiting example with reference to the accompanying diagrammatic drawings, in which:

FIG. 9 is a flow chart illustrating a "station-allocation" routine called by the FIG. 7 program to determine the association between stations and sub-networks of the FIG. 1 network;

DETAILED DESCRIPTION OF THE INVENTION

Figure 1:
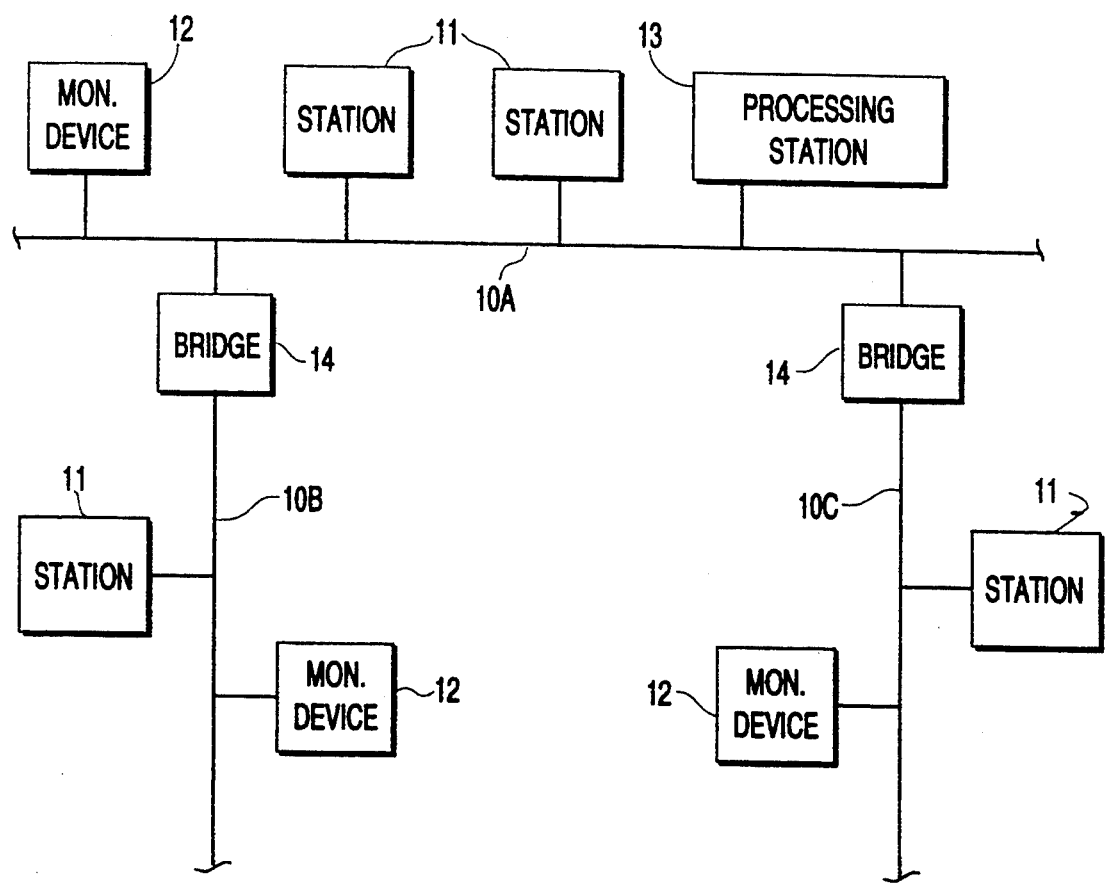
FIG. 1 is a block diagram of one network in which a processing station and a number of sampling monitoring devices have been connected to form a network monitoring system capable of implementing the method of the present invention.

FIG. 1 illustrates a typical local area network in which a plurality of stations 11, 12, and 13 are interconnected via cable segments 10A, 10B, and 10C. The network is divided into three sub-networks by bridges (spanning devices) 14 that connect respective ones of the cable segments 10B, 10C to the cable segment 10A. As is well known in the art, the bridges serve to filter traffic passing between the network segments, such that messages originating from a particular segment and destined for a station on the same segment (local traffic) are not passed through the bridge or bridges 14 to the other segments whereas messages originating in one segment and intended for another one (non-local traffic) are allowed across the bridge. The operation for such bridges is generally imperfect and some local traffic will usually 'leak' through the bridges.

Figure 2:
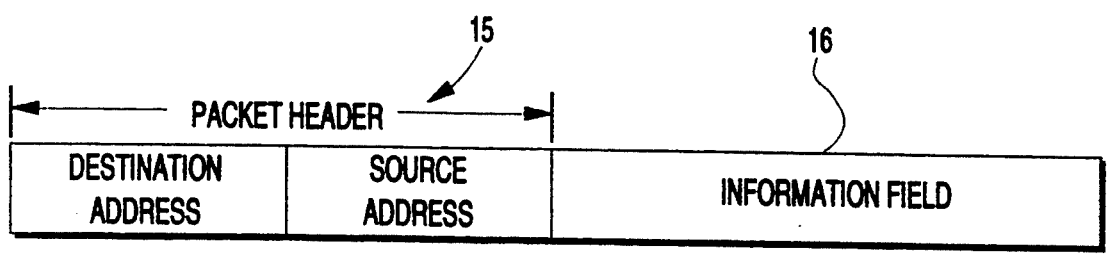
FIG. 2 is a diagram illustrating the general form of a data packet transmitted over the FIG. 1 network.

In the illustrated local area network, messages between the stations 11, 12 and 13 are transmitted in the form of packets that are broadcast over the network. Typically a packet will have the form illustrated in FIG. 2 with a packet header 15 containing a source address (the address of the station sending the packet) and a destination address (the address of the station intended to receive the packet), and an information field 16 containing the data to be passed to the receiving station and normally including error checking codes. Depending on the particular packet format being used, other fields may also be present; thus, for example, there may be a CRC (cycle redundancy check) field covering both the packet header and information field.

The FIG. 1 network may, for example, be an Ethernet network well known to persons skilled in the art.

The network of FIG. 1 is arranged to be monitored by a network monitoring system comprising a plurality of monitoring devices (stations 12) and a central processing station 13. Each of the monitoring devices is associated with a respective one of the sub-networks of the network. As will become clear below, each monitoring device is operative to randomly sample the packets on its associated sub-network and transmit data on the sampled packets back to the processing station 13 for processing and analysis.

Figure 3:
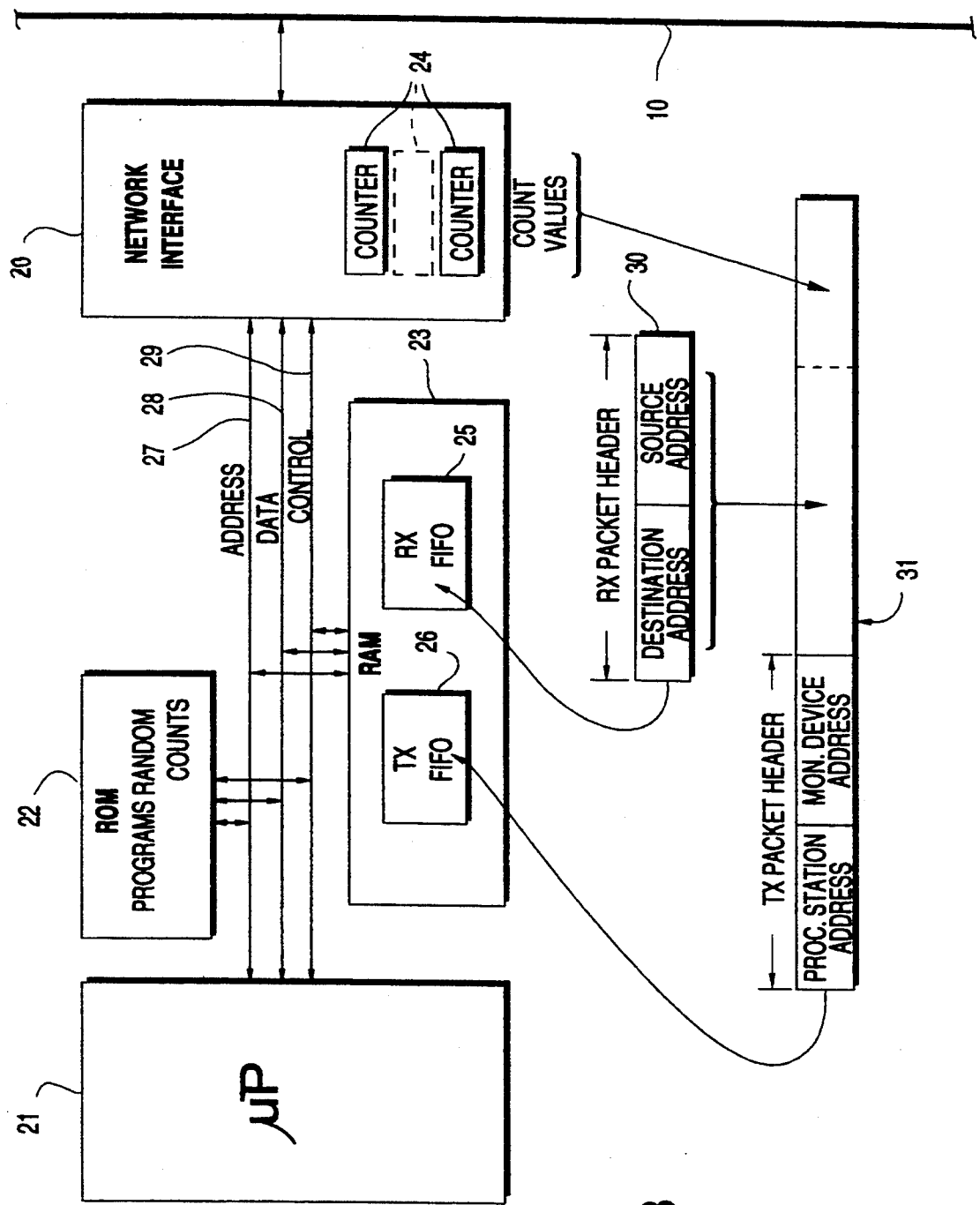
FIG. 3 is a block diagram of a sampling monitoring device of FIG. 1.

The form of each monitoring device is illustrated in FIG. 3. The device comprises a network interface 20, a microprocessor 21, and ROM (non-volatile, pre-programmed memory) and RAM (re-writable memory) units 22 and 23 respectively. These units 20 to 23 are all interconnected via address, data and control buses 27, 28 and 29 respectively. The network interface 20 is operative to carry out all the low level functions necessary to interface the monitoring device of FIG. 3 to the network cable 10 and to pass received packets to a receive queue, in the form of a FIFO (First In First Out) buffer 25 in RAM 23. The network interface is further operative to transmit packets held in a transmit queue, formed by a FIFO buffer 26, in RAM 23. The network interface 20 thus constitutes packet receive means and packet transmit means for the monitoring device. In the present example, the network interface 20 is arranged to receive all packets regardless of their destination address contained in the packet header. Furthermore, the network interface 20 is operative to pass only the header portion 30 of each received packet to the receive FIFO buffer 25.

The network interface 20 is arranged to operate in co-ordination with the microprocessor controller 21 and, in particular, informs the microprocessor 21 each time a packet header is inserted into the receive FIFO buffer 25, by means of a suitable interrupt control signal.

The network interface 20 also contains various counters 24 which hold a number of counts including the total number of packets received, the number of packets received which according to their CRC field are in error, the number of packets received below the minimum accepted length (RUNT packets), and the number of packets received above the maximum accepted length (JABBER).

Implementations of the network interface 20 for particular network protocols are well known in the art. Thus, for example, for an Ethernet network, the network interface 20 may be constituted by Intel Corporation chips 82502, 82501, and 82586; in this case an appropriate microprocessor constituting the microprocessor 21 is the Intel processor 80186.

The ROM 22 holds the programs run by the microprocessor 21 and also a table of random count values predetermined according to an exponential distribution.

The processor 21 is operative to run a background program in which it does nothing (i.e., an idling program). The main working program for the processor 21 is an interrupt service routine which is called each time the network interface 20 generates a processor interrupt to tell the processor that it has stored a new packet header in the receive FIFO 25. The interrupt service routine, which will be described in more detail below, operates to randomly select a received packet header and form it into a collected-data packet together with the current count values of the counters 24. The random selection of received packet headers is effected by utilizing the predetermined random counts stored in ROM 22. The collected-data packet so formed is put into the transmit queue FIFO 26 and, in due course, is transmitted by the network interface 20 back to the processing station 13. The header of each collected-data packet contains as its source address the address of the monitoring device concerned while the destination address is that of the processing station (alternatively, a multi-cast address can be used to which the processing station is set to listen).

Figure 4:
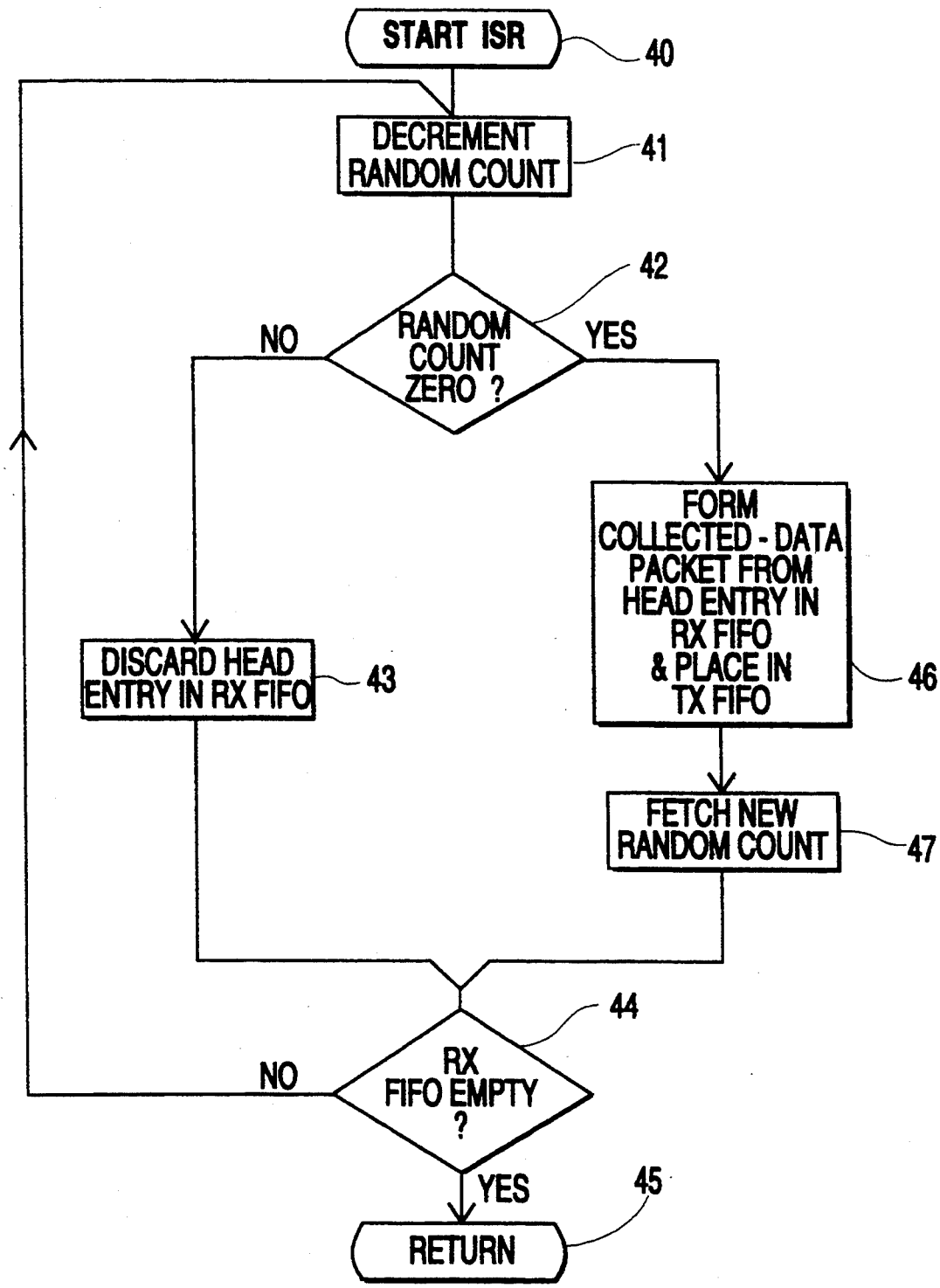
FIG. 4 is a flow chart illustrating the main interrupt service routine run by a controlling microprocessor of the FIG. 3 device.

A more detailed description of the operation of the monitoring device will now be given with reference to FIG. 4 which is a flow chart of the interrupt service routine run by the microprocessor 21. The microprocessor 21 will be taken to be in a state in which it is running its background (idling) program and in which it has one of the random count values held in an internal register (i.e., access to the first count value upon switch-on of the monitoring device would be part of an initialization routine). It will also be assumed that the receive and transmit FIFO buffers 25 and 26 are empty.

On receiving a packet over the network cable 10, the network interface 20 passes the packet header to the receive FIFO buffer 25, updates its counters 24 and generates an interrupt signal for the microprocessor 21. On receipt of this interrupt, the microprocessor 21 executes the interrupt service routine illustrated in FIG. 4. The first step 40 of this routine carries out the normal house-keeping tasks associated with such routines including saving the volatile environment parameters of the background program and masking further interrupts.

Next, the microprocessor decrements the random count value held in its internal register (step 41) and then checks the remaining value to see if this has been reduced to zero (step 42).

If the count value is still greater than zero, the microprocessor 21 discards the head entry in the receive FIFO buffer 25 (step 43).

Thereafter, the microprocessor must check the receive FIFO buffer 25 to see if any further packet headers have been entered into the buffer by the network interface 20 during the preceding steps of the interrupt service routine (step 44). Generally this will not be the case and the microprocessor will then exit its interrupt service routine and restore its background environment and unmask its interrupts (step 45). However, in the event that the receive FIFO buffer 25 contains a further packet header, the interrupt service routine will pass from step 44 back to step 41.

If during the test (step 42) carried out on the count value held in its internal register, the microprocessor 21 finds that this count value has been reduced to zero, the interrupt service routine will proceed to generate a collected-data packet 31 in respect of the packet header at the top of the receive FIFO buffer 25 (step 46). This collected-data packet 31 is assembled in the transmit FIFO buffer 26 from the received packet header 30, the count values from the counter 24, the address of the monitoring device (source address for the collected-data packet) and the address of the processing station (destination address for the collected-data packet header). After the collected-data packet has been assembled, the microprocessor 21 flags the network interface 20 to indicate that there is a packet ready for transmission. (The network interface 20 will transmit the packet as and when it is able and cancel the flag set by the microprocessor 21 once this has been done).

After completion of step 46 of the interrupt service routine, the microprocessor fetches a new random count from ROM 22 and stores this new random count in its internal register (step 47). The microprocessor then proceeds to step 44 and running of the interrupt service routine proceeds as previously described.

The size of the receive and transmit FIFO buffers 25 and 26 can be quite small, for example, sufficient to hold only two or three entries. This is possible with respect to the receive buffer 25 because in general the interval between packets received by the network interface 20 will be sufficient for the microprocessor 21 to run its interrupt service routine and clear the top entry from the receive buffer. In any event, the occasional overflowing of the receive buffer 25 is not of major consequence since a missing packet will generally have minimal effect on the statistical measurements being conducted by the network monitoring system. This equally applies to the transmit buffer 26 where an overflow is even less likely to occur as its entries are only in respect of the randomly selected ones of the received packets.

The above-described implementation of the monitoring device does mean that the count values included in a collected-data packet from the counter 24 may not be the count values current at the time that the relevant packet was actually received by the network interface (this is because of the possible delay in actually processing the packet header). However, again, any discrepancy in this respect will be minor and will have minimal effect on the validity of the statistically determined results produced by the network monitoring system. Of course, it would be possible to design circuitry which associated the count values present in counters 24 with the header of each received packet. However, the added circuit complexity needed to do this is generally not justified.

The data structures used to implement the receive and transmit FIFO buffers 25 and 26 in RAM 23 will be apparent to a person skilled in the art and will therefore not be described herein. Furthermore, it will be appreciated that although in the FIG. 3 embodiment the random selection of incoming packets has been effected by storing predetermined random numbers in ROM 22, these random numbers could alternatively be generated as and when required by the processor 21 (although this is not preferred as it places extra processor requirements on the microprocessor). Typically, the random numbers are such as to give an average skip between selected packets of ninety nine; other values may be more appropriate depending on traffic density, sampling period and acceptable statistical error level. The random selection of packets could be effected on a time basis rather than on the number of packets received.

The collected-data packets sent out by the monitoring devices 12 over the network are all received by the processing station 13 which stores these packets and carries out subsequent processing and analysis.

The processing station 13 is, for example, constituted by a standard workstation interfacing with the network through a network interface (not shown) similar to the interface 20 of the FIG. 3 monitoring device 12. Such a workstation will be provided in standard manner with RAM memory for storing working data and program segments, ROM memory for permanent storage of programs, a processor for processing data held in the RAM memory in accordance with the programs, and various input/output devices; none of these elements are illustrated or described herein as they are all standard and well known to persons skilled in the art.

The processing station 13 carries out three main tasks, namely:

(1) generation of traffic matrices for each sub-network on the basis of the collected-data packets received;

(2) the association of stations 11 with the various sub-networks using the sub-network traffic matrices; and (3) testing for the presence of bridge between all pairs of sub-networks by using the sub-network traffic matrices.

Figures 5, 6:
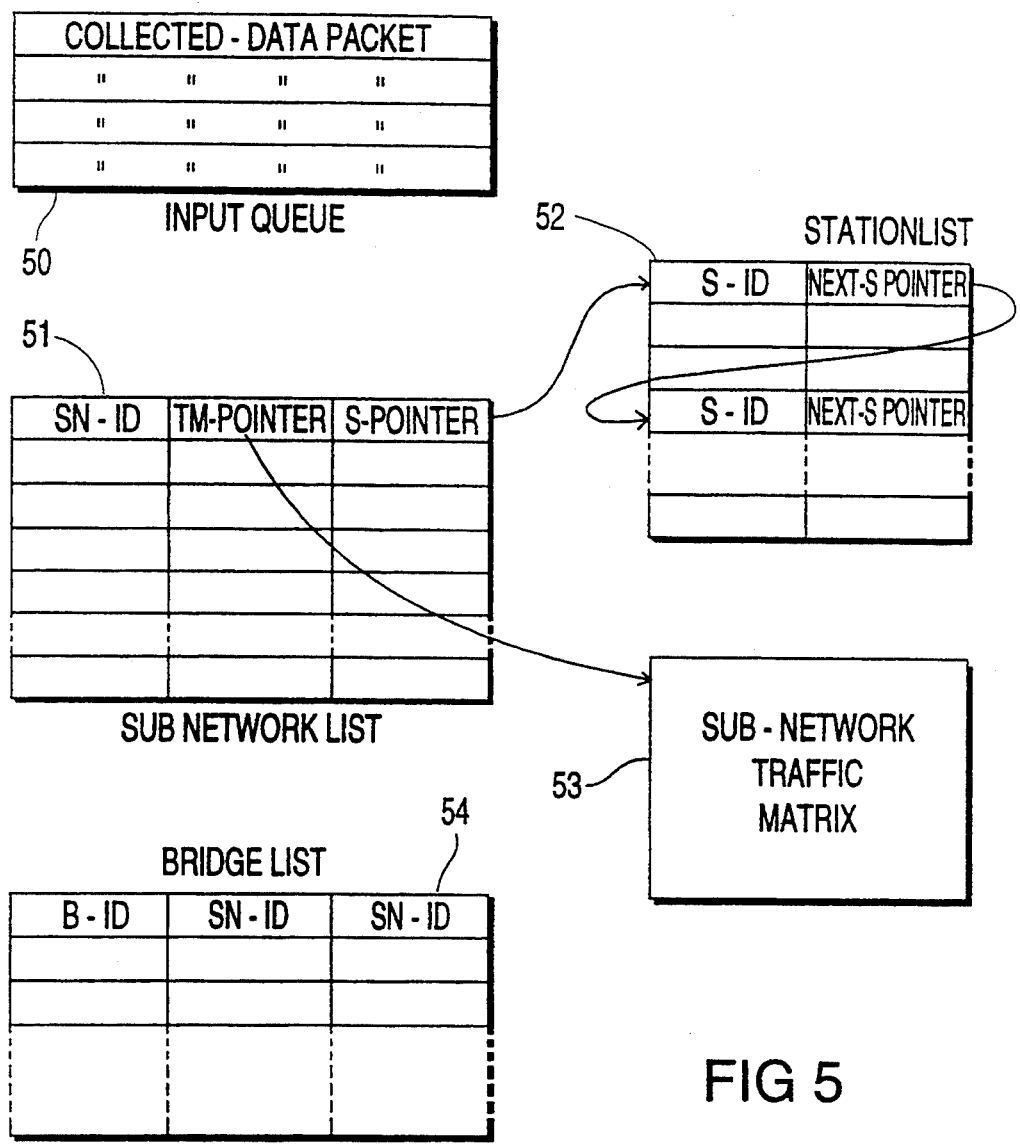
FIG. 5 is a diagram illustrating the main data structures utilized by the processing station of FIG. 1 in processing data from the sampling monitoring devices.
FIG. 6 shows an example of a partial traffic matrix for a sub-network of the FIG. 1 network.

The main data structures employed by the processing station 13 in carrying out these tasks are illustrated in FIG. 5, the data structures being created and maintained in the RAM memory of the station 13. The main data structures are:

Input-queue 50 this is a queue of collected-data packets required by the network interface of the station, each packet being temporarily held in the queue pending processing;

Sub-Network List 51 this is a list of all the known sub-networks of the network with each sub-network having a respective entry comprising a field storing the sub-network identity SN-ID, a first pointer TM-POINTER, and a second pointer S-POINTER;

Station List 52 this is a list of all the known stations 11 of the network with each station having a respective entry comprising a field storing the station identity S-ID, and a pointer NEXT-S POINTER. The first station to be associated with any particular sub-network is associated with that sub-network by setting the S-POINTER of the corresponding sub-network entry in the sub-network list 51, to point to the appropriate station entry in the station list 52. The association of further stations with the same sub-network is achieved by using the NEXT-S POINTER of the last preceding station associated with the sub-network to point to the entry of the next station to be associated with the sub-network, thereby building up a linked list of stations.

Sub-Network Traffic Matrix 53 This is an array formed for each sub-network to hold the partial traffic matrix data for the sub-network. The traffic matrix array relevant to a sub-network is pointed to by the pointer TM-POINTER of the corresponding entry in the sub-network list 51. FIG. 6 illustrates a typical partial traffic matrix giving for each source station/destination station pair, the number of packets carried by the sub-network concerned in a given interval of time (the different stations 11 are here designated 11A, 11B, 11C . . . 11N).

Bridge List 54 This is a list of all the known bridges of the network with each bridge having a respective entry comprising a field storing the bridge identity B-ID, and a pair of fields for storing the identities (SN-ID) of the sub-networks connected by the bridge.

Having outlined the main data structures used by the processing station 13, a description will now be given as to how the station carries out its tasks using these structures.

Figure 7:
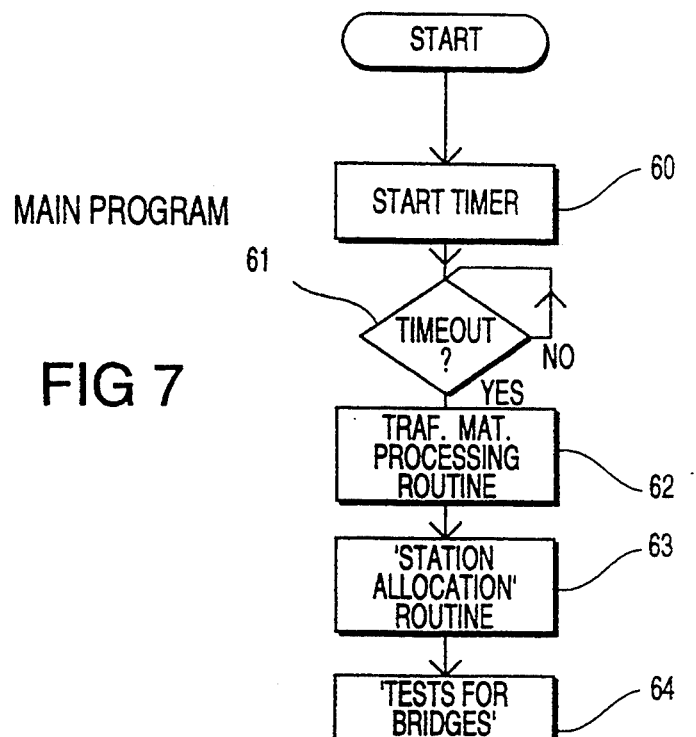
FIG. 7 is a flow chart illustrating a main program run by the processing station.

The main program run by the processing station 13 is illustrated in FIG. 7. Upon start up of the program, a predetermined time period (e.g., 1 hour), is timed (steps 60,61) during which the main program is idle but collected-data packets are received by the processing station and processed by an interrupt service routine to construct traffic matrices for the sub-networks of the network. After time-out of the predetermined time interval, the main program carries out statistical processing of the traffic matrices (step 62) before proceeding to ascertain topological features of the network, first of all by associating stations with sub-networks using a "station allocation" routine (step 63), and then by ascertaining where bridges are present in the network using the "tests for bridges" routine (step 64); finally, the main program terminates.

Figure 8:
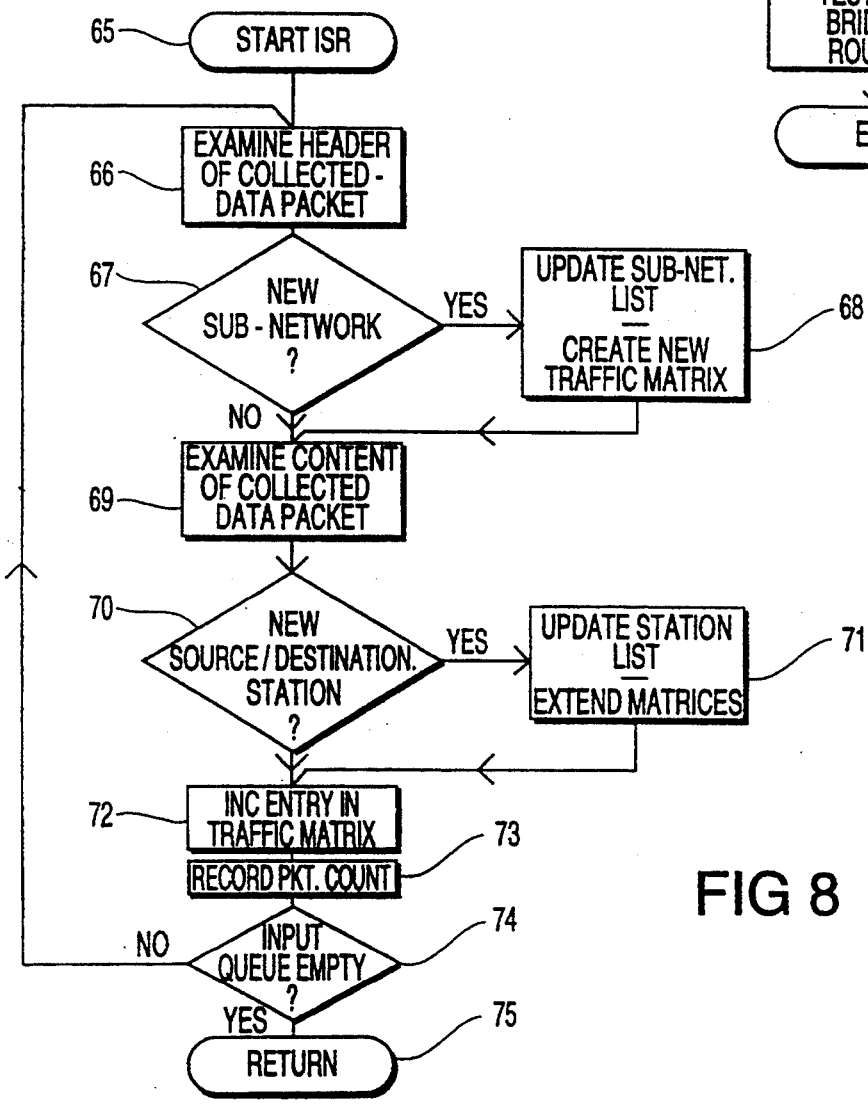
FIG. 8 is a flow chart illustrating an interrupt service routine which is run by the processing station, upon receipt of data from a sampling monitoring device, in order to build up partial traffic matrices.

FIG. 8 illustrates the interrupt service routine used to derive sub-network traffic matrices from the received collected-data packets. The interrupt service routine is called in response to the generation of an interrupt by the network interface of the station 13 following the receipt thereby of a collected-data packet and the storage of that packet in the input queue data structure 50. Upon start-up of the interrupt service routine, the normal housekeeping tasks of storing the volatile environment of the main program and masking interrupts is effected (step 65). Next, the header of the collected-data packet at the top of the input queue is examined (step 66). The source address contained in the header identifies the monitoring device that generated the collected-data packet; indeed, on the assumption that one monitoring device is associated with each sub-network of the network, the address of the monitoring device also serves to identify the associated sub-network. The monitoring device addresses are therefore used either directly or indirectly as the sub-network identities SN-ID. By examining the source address contained in the header of the collected-data packet under examination, it is therefore possible to tell, by checking against the sub-network list 51, whether the collected-data packet comes from a known sub-network or whether the packet indicates the presence of a previously unknown sub-network (step 67). If a new sub-network is identified, then a new entry is made in the sub-network list 51 and a new sub network traffic matrix array 53 is created (step 68); the TM-POINTER of the sub-network entry is set to point to the new traffic matrix array while the S-POINTER is set to null.

Thereafter, the interrupt service routine goes on to examine the contents of the data field of the collected-data package under consideration (step 69). A check is made of the source station and destination station addresses held in the data field to ascertain if either of these addresses indicates the presence of a previously unknown station, that is, a station not contained in the station list 52 (step 70). If a new station is identified, then the station list 52 is updated (with its NEXT-S POINTER set to null) and the existing sub-network traffic matrices 53 are extended to include the new station (step 71).

Once the foregoing preliminary steps have been effected, the interrupt service routine updates the traffic matrix 53 for the relevant sub-network (as identified by the source address in the header of the collected-data packet) by incrementing the entry for the source station/destination station pair concerned (as indicated by the addresses held in the data field of the collected-data packet)—see step 72.

Because of the sampled nature of the information provided by the monitoring devices 12, the sub-network traffic matrices built directly using the raw data from the monitoring devices 12, is preferably subject to statistical processing. This processing is effected in step 62 of the main program at the time-out of the sampling period. However, in order to carry out this processing, it is necessary to record the total number of packets carried by each sub-network during the sampling period. As explained above, the total current packet count for a sub-network is included in the information field of each collected-data packet sent to the processing station 13. In order to ascertain the total number of packets carried on a sub-network during the sampling period, step 73 of the interrupt service routine is operative to record both the current packet count for the first collected-data packet received in respect of a sub-network and also the current packet count of the last-preceding collected-data packet received during the sampling period in respect of that sub-network. These count values can be recorded for each network by appropriate fields (not shown) in the corresponding sub-network entry in the sub-network list 51. At the end of the sampling period, subtraction of the count values will give the total number of packets carried by the sub-network during the sampling period.

Finally, the input queue 50 is checked to ensure that no new collected-data packets have been received while the interrupt service routine has been running (step 74); assuming this is the case, the interrupt service routine terminates (step 75) by restoring the main program environment parameters and unmasking the interrupts. In the event that the input queue is not empty, steps 66 to 73 are repeated.

Following the termination of the sampling period, the main program calls the routine for effecting statistical processing of the sub-network traffic matrices (step 62 of FIG. 7). This processing involves devising for each element of each sub-network traffic matrix mean and variance values for an assumed normal distribution, these values being stored back into the relevant traffic matrix array. In order to calculate these mean and variance values, it is necessary to know not only the basic aggregated sample value "$o_c$" constituted by each traffic matrix element (that is, the number of samples of a class "C"), but also the total number "o" of samples involved in the generation of the relevant sub-network traffic matrix, and the total number of packets "f" carried by the sub-network during the sampling period. The total number "o" of samples can be obtained either by summing all elements of the relevant sub-network traffic matrix or by keeping a running total during the sampling period. As already discussed, the total number of packets "f" is obtained by subtracting an initial packet count value from a final count value, both these values being stored in the sub-network list 51 The values "$o_c$", "o" and "f" are then used in accordance with the following $$\text{estimate of mean} = f o_c / o \quad (1)$$

$$\text{estimate of variance} = f^2(o - o_c) o_c / o^2 \quad (2)$$

The "station allocation" routine is called by the main program, following processing of the traffic matrices, is illustrated in FIG. 9. This routine operates by taking each station in turn and searching through all the sub-network traffic matrices to identify the sub-network carrying the most traffic sourcing from the station concerned; this sub-network is then treated as the one to which the station is directly connected and an appropriate link is made in the linked list linking each sub-network to its associated stations. More particularly, following the start up of the routine (step 80) two variables are initialized to zero, these being the variables "CC-SUM" and "CC-ID" (see step 81). The variable CC-ID is used to hold the identity (SN-ID) of the sub-network which at any particular point during execution of station allocation routine is the current choice for being the sub-network associated with a station under consideration. The variable CC-SUM holds the sum of packets sourcing from the station under consideration that was calculated for the current choice sub-network.

Following initialization of the variables CC-ID and CC-SUM, the station allocation routine selects in turn each station in the station list 52 and effects steps 83 to 88 for each station. This successive selection and processing is achieved by a loop set up by steps 82 and 89 in combination. For each station (identity "S-ID"), each sub-network contained in the sub-network list 51 is considered in turn and its traffic matrix examined. This successive examination is carried out in the loop established by steps 83 and 87 in cooperation. For each sub-network traffic matrix examined, the traffic sourcing from the currently selected station is added up for all destination stations and the resulting number is stored to variable "SUM" (step 84). The value of "SUM" is then compared with the value held in "CC-SUM" (step 85); if the former is greater than the latter then the value held in "SUM" is transferred to "CC-SUM" and the sub-network identity "SN-ID" associated with the sub-network traffic matrix under consideration is stored in the variable "CC-ID" (step 86).

The comparison of "SUM" and "CC-SUM" is done using hypothesis testing techniques in view of the statistical nature of the quantities concerned. Such techniques are well known to persons skilled in the art and can be found in many standard works (for example, "Introductory Probability and Statistical Applications", Meger, published by Addison-Wesley, 2nd Edition 1970). Accordingly, a description of the processing involved will not be given here except to note that where the compared mean values are within a certain range of each other, a judgement will be made that no decision can be validly made as to which is the greater. Where such a judgement is made, this is noted since it implies that no valid allocation can be made to associate the station concerned with a particular sub-network (of course, if a subsequent value of "SUM" for the station does exceed "CC-SUM" sufficiently to enable a statistically valid decision to be made, then this will override any previous 'indeterminable' judgement made for the station).

Step 87 loops the process until all sub-network traffic matrices have been examined in respect of a particular station. Upon exiting of this loop, the variable "CC-ID" will contain the identity of the sub-network whose traffic matrix contained the highest number of entries for traffic sourcing from the station under consideration. This sub-network is taken to be one to which the station under consideration is connected (unless, as indicated, a judgement has been made that a decision cannot be validly made). Therefore, where the station under consideration is the first to be allocated to the sub-network identifed by "CC-ID" (as indicated by the null setting of the pointer S-POINTER in the sub-network entry), the S-POINTER for that sub-network entry is set to point to the entry in the station list 52 corresponding to the station (identity "S-ID") under consideration (step 88). Where the station under consideration is not the first to be allocated to the network identifed by "CC-ID", then the chain of stations associated with the sub-network and pointed to by the relevant S-POINTER is followed to the last station entry in the chain and then the NEXT-S POINTER of that station entry is set to point to the entry for the station under consideration.

Thereafter, step 89 causes the routine to loop back to step 82 until all the stations have been allocated to sub-networks. When this is achieved, the routine terminates (step 19).

After allocating stations to sub-networks, the main program (FIG. 7) initiates the "tests for bridges" routine in order to ascertain which pairings of sub-networks are interconnected by bridges. Before describing this routine in detail, the basis for the tests used to identify bridges will be discussed.

Consider the case where it is desired to ascertain whether a bridge directly connects two sub-networks Y and X such as to allow non-local traffic on sub-network Y to pass to sub-network X. If the remaining sub-networks of the network (that is, the group of sub-networks other than X and Y) are considered as a group R, then the network and the flow of traffic from sub-network Y can be represented by the diagram of FIG. 10A in the case where a bridge does directly connect sub-networks Y and X, and by the diagram of FIG. 10B in the case where there is no bridge connecting sub-networks Y and X. In these diagrams, various traffic flow components are represented by the letter 'T'followed in parenthesis by letters representing the sequence of sub-networks followed by the traffic component from its source on sub-network Y, to its destination. Thus the component of traffic sourcing on sub-network Y and passing to sub-network X through the sub-network group R, is represented by T(YRX).

Figure 10A:
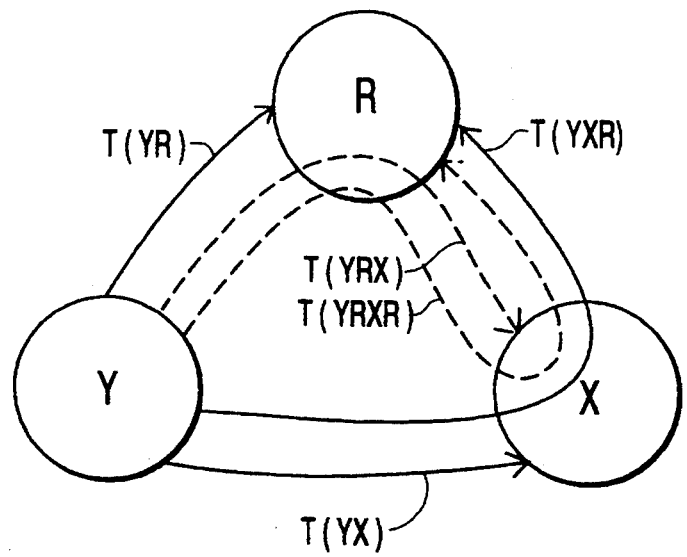
FIG. 10A is a diagram illustrating possible traffic flows in the network between two sub-networks Y and X when they are connected by a bridge.

The dashed traffic flow components T(YRX) and T(YRXR) shown in FIG. 10A, will only be present where the network topology includes a loop providing both a direct and an indirect path to sub-network X. Indeed, the traffic flow components T(YR) and T(YXR) of FIG. 10A may also not exist if the sub-networks R are only connected to sub-network Y through sub-network X.

In the first of the three tests for a bridge, consideration is given to what elements of the total traffic coming from sub-network Y (regardless of destination) are seen on the sub-network X and on the sub-network group R. In this consideration, the following representation is used:

$T_1$ = all traffic from sub-network Y, regardless of destination;

$[T_1]_X$ = that part of $T_1$ seen on sub-network X;

$T_1(Y\ldots)$ = that component of $T_1$ following the route indicated in parenthesis.

By reference to FIG. 10A, it can be seen that when a bridge directly links sub-network Y to sub-network X:

$$[T_1]_x = T_1(YX) + T_1(YXR) + T_1(YRX) + T_1(YRXR) \quad (3)$$

$$[T_1]_R = T_1(YR) + T_1(YXR) + T_1(YRX) + T_1(YRXR) \quad (4)$$

Formulae (3) and (4) represent the most general cases. The last two components of both formula (3) and (4) will not be present in a non-looped network where there is only a direct path to sub-network X. Furthermore, these components, and also the component $T_1(YR)$ from formula (4) will be absent if the only bridge from sub-network Y is the one connecting to sub-network X.

Figure 10B:
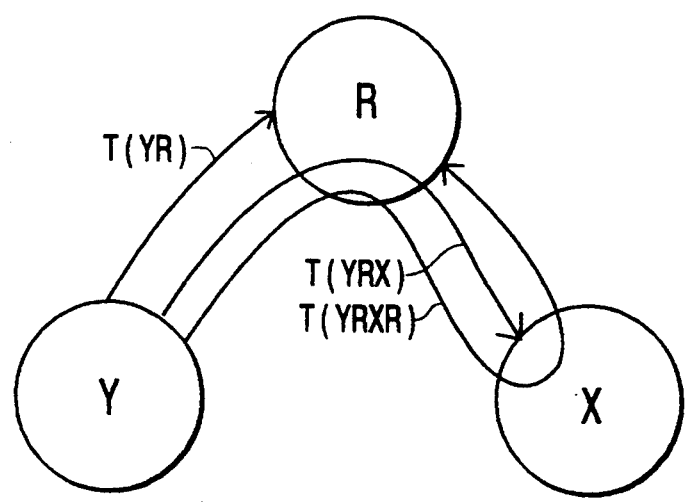
FIG. 10B is a diagram similar to FIG. 10A but for the case when no bridge inter-connects sub-networks Y and X.

Referring now to FIG. 10B, it can be seen that in the absence of a bridge directly linking sub-network Y to sub-network X:

$$[T_1]_x = T_1(YRX) + T_1(YRXR) \quad (5)$$

$$[T_1]_R = T_1(YRX) + T_1(YRXR) + T_1(YR) \quad (6)$$

from which it follows that, absent a bridge connecting sub-network Y to sub-network X, $$[T_1]_R \geq [T_1]_x \quad (7)$$

If formula (7) is not satisfied, ie. if:

$$[T_1]_x > [T_1]_R \quad (8)$$

then a bridge must exist directly connecting sub-network Y to sub-network X. In other words, a bridge can be taken to exist between sub-network Y and sub-network X, if there is more traffic from stations on sub-network Y seen on sub-network X, than seen on all the sub-networks of the remaining group R. This test will not necessarily identify a bridge which exists between sub-networks Y and X, but it will do so in many cases and will not find a bridge where none exists.

The second of the three tests for a bridge is similar to the first but only considers the traffic sourcing from sub-network Y that is not destined for sub-network X, this traffic being designated $T_2$. By reference to the traffic components shown in FIG. 10B not destined for sub-network X, it can be seen that in the absence of a bridge linking sub-network Y to sub-network X:

$$[T_2]_x = T_2(YRXR) \quad (9)$$

$$[T_2]_R = T_2(YR) + T_2(YRXR) \quad (10)$$

From this it follows that in the absence of a bridge:

$$[T_2]_R \geq = [T_2]_x \quad (11)$$

if formula (11) is not satisfied, i.e. if:

$$[T_2]_X > [T_2]_R \qquad (12)$$

then a bridge must exist directly connecting sub-network Y to sub-network X. In other words, a bridge can be taken to exist between sub-network Y and sub-network X, if there is more traffic from stations on sub-network Y not destined for sub-network X, seen as sub-network X, than seen on all the sub-networks of the remaining group R. Again, this test will not necessarily find a bridge but it will not find one if one does not exist.

The third of the three tests for the presence of a bridge relies on the fact that most practical bridges are 'leaky', that is they allow a small portion of the traffic destined for a sub-network connected to the bridge to cross through the bridge to a connected sub-network. This leaked traffic was not taken into account in considering the traffic components relevant to the first two tests as the leaked components will be small in comparison with the other components and, in any case, as will be apparent from what follows, the presence of these leaked components does not alter the validity of the previously derived test formulae.

Figure 11:
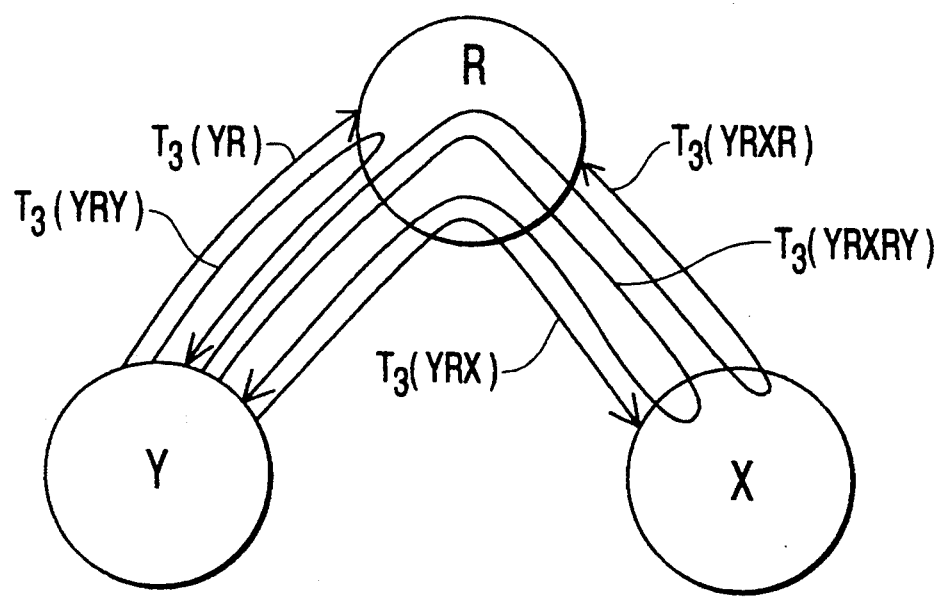
FIG. 11 is a diagram illustrating possible leakage traffic flows from sub-network Y when no bridge inter-connects sub-networks Y and X.

If the traffic sourcing from sub-network Y and destined from sub-network Y is designated $T_3$, then the possible traffic components are as shown in FIG. 11. It should be noted that the fate of the 'leaked' traffic is uncertain and will depend on the nature of the operation of the bridges of the network. Thus, while the bridges may serve to filter out the leaked traffic from further transmission through the network, this may not always be the case. Accordingly, FIG. 11 includes all cases of the leaked traffic being allowed to return to sub-network Y as well as all cases of the leaked traffic being filtered out.

From FIG. 11 it can be seen that in the absence of a bridge linking sub-network Y to sub-network X:

$$[T_3]_X = T_3(YRXRY) + T_3(YRX) + T_3(YRXR) \qquad (13)$$

$$[T_3]_R = T_3(YRXRY) + T_3(YRX) + T_3(YRXR) + T_3(YR) + T_3(YRY) \qquad (14)$$

From this it follows that in the absence of a bridge:

$$[T_3]_R = \geq [T_3]_X \qquad (15)$$

If formula (15) is not satisfied, ie. if:

$$[T_3]_X > [T_3]_R \qquad (16)$$

then a bridge must exist directly connecting sub-network Y to sub-network X. In other words, a bridge can be taken to exist between sub-network Y and sub-network X, if there is more traffic from stations on sub-network Y destined for sub-network Y, seen on sub-network X, than seen on all the sub-networks of the remaining group R. Again, this test will not necessarily find a bridge but it will not find one if one does not exist.

It will be appreciated that in view of the direction of the inequality in formula (16), superimposing the leakage traffic flows onto those discussed above in respect of the first and second bridge tests, does not alter the results obtained in formulas (8) and (12).

Figure 12:
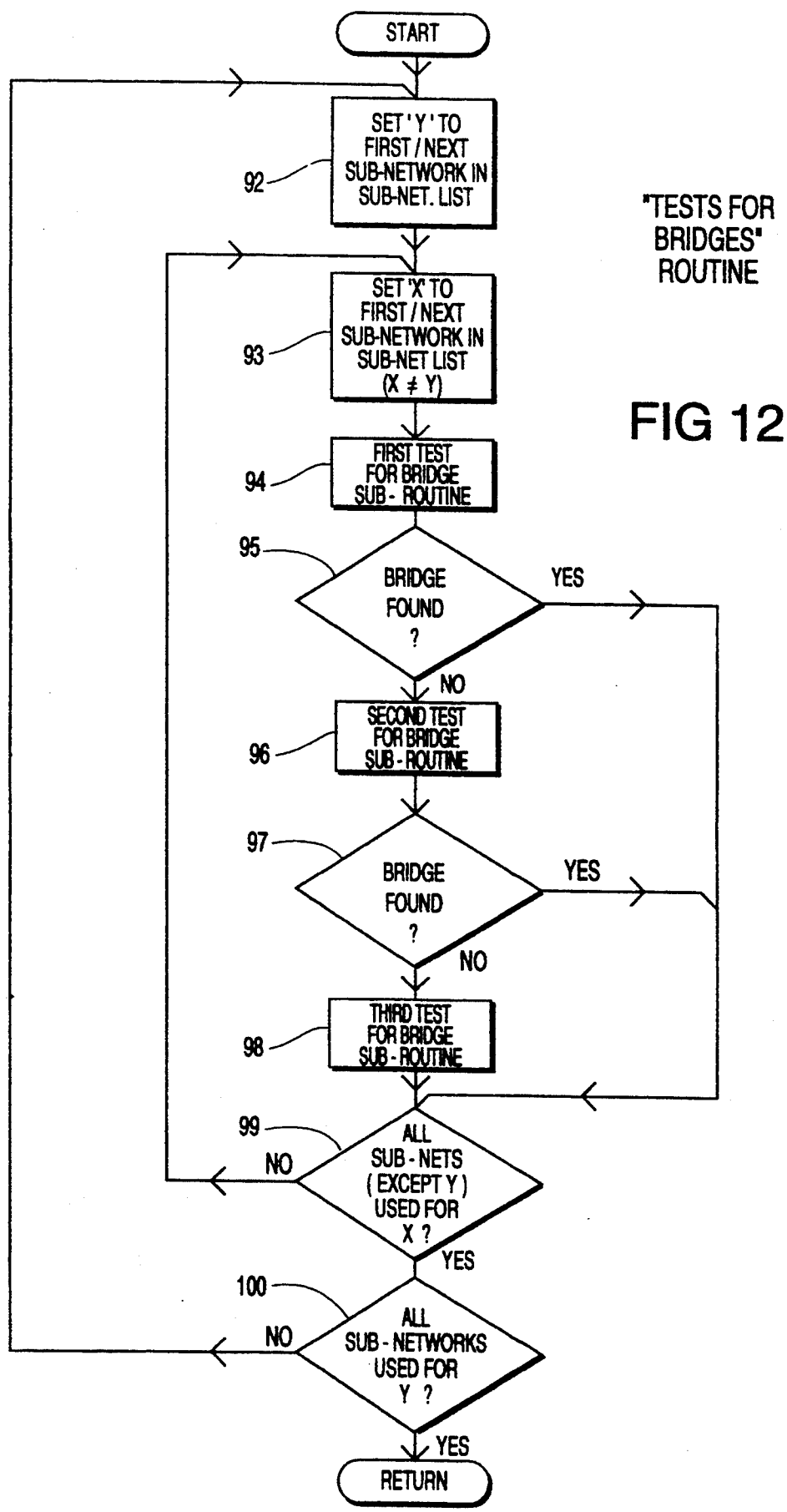
FIG. 12 is a flow chart illustrating a "tests for bridges" routine called by the FIG. 7 program to determine which pairs of sub-networks are inter-connected by bridges.

The "test for bridges" routine shown in FIG. 12 takes each pairing of sub-networks and then applies each of the three tests for bridges described above to ascertain whether or not a bridge is present linking a first one of the sub-networks to the second. The nature of the tests is such that they are uni-directional—that is, they test for whether there is a bridge connection allowing traffic flow in one direction from one sub-network to the other. However, the routine of FIG. 12 applies the tests in both directions by first applying the tests to the sub-network pair in one ordering and then subsequently applying the tests to the sub-network pair in the other ordering.

Considering FIG. 12 in more detail, each sub-network of the sub-network list 51 is taken in turn as the first sub-network Y of a sub-network pair to be subjected to the bridge tests (see step 91). For each sub-network assigned as the sub-network Y, each of the remaining sub-networks is taken in turn as the second sub-network X of the pair of sub-networks to be tested (step 93). Once the pair of sub-networks Y,X to be tested has been set up, the first test for a bridge is applied by calling an appropriate routine (step 94). After this first test has been completed, a check is made to see whether the test were successful, if it was, then the second and third tests are not applied to the pair Y,X. However, if a bridge was not found by the first test, the second test is then executed (step 96).

If after completion of the second test, a bridge still has not been found between pairing YX (step 97), then the third test for the presence of the bridge is carried out (step 98).

The situation is then reached when either a bridge has been found between the sub-network pair YX, or all three tests have been carried out and no bridge has been found. Where a bridge has been found, the bridge list will have been updated as the final step of the relevant bridge test sub-network.

Thereafter, the next sub-network pairing is taken, either by looping back to select the next second sub-network X (step 99), or where all the sub-networks (except for the current Y sub-network) have been used as the second sub-network X, by looping back to select a new sub-network for the first sub-network Y (step 100).

In due course, all sub-network pairings will have been tested in both directions. Thereafter, the "test for bridges" routine is terminated.

Figure 13:
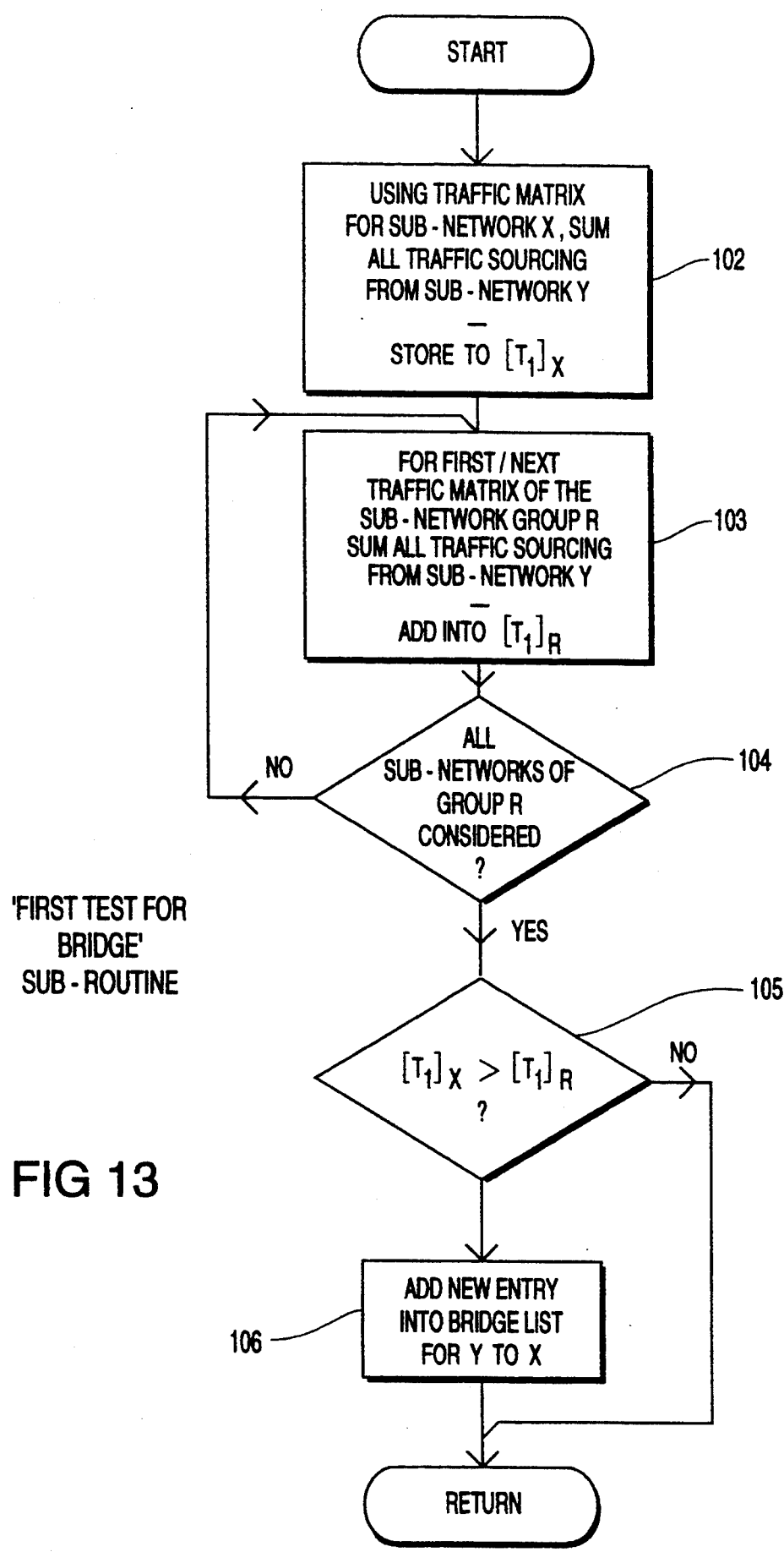
FIG. 13 is a flow chart illustrating a "first test for a bridge" sub-routine called by the FIG. 12 routine.

FIG. 13 illustrates the "first test for bridge" sub routine. It will be recalled that this first test involves comparing the total of all the traffic sourcing from a first sub-network Y as seen on a second sub-network X, with the total of all the traffic sourcing from the sub-network Y as seen on all the other sub-networks (that is, excepting X and Y). The first step 102 of the sub routine involves accessing the traffic matrix for the sub-network X and summing all traffic sourcing from sub-network Y (this traffic being the traffic originating from the stations on sub-network Y, these stations being identified by reference to the linked list starting at the S-POINTER for sub-network Y). The resultant sum is stored to a variable representing $[T_1]_X$.

Next, in step 103 and 104 the traffic matrix for each sub-network other than the networks Y and X is examined in turn and an accumulative total arrived for traffic sourcing from sub-network Y, no regard being paid to the fact that the same traffic sourcing from sub-network Y may be viewed on several of the sub-networks under consideration. The total traffic value derived from all these sub-network traffic matrices is stored in a variable representing $[T_1]_R$. Next, the values of $[T_1]_X$ and $[T_1]_R$ are compared (step 105). In the present case, in view of the statistical nature of the data being processed, this comparison is done using hypothesis testing techniques.

If the value of $[T_1]_X$ is greater than the value of $[T_1]_R$ then a decision is made that a bridge exists permitting traffic flow directly from sub-network Y to sub-network X. A corresponding entry is therefore made in the bridge list identifying the new bridge and the first and second sub-networks that it links (step 106). Thereafter, "the first test for bridge" sub-routine terminates.

The "second test for bridge" sub-routine is similar to that shown in FIG. 13 except that only traffic sourcing from sub-network Y that is destined for sub-network X is totalled in the steps corresponding to steps 102 and 103.

The "third test for a bridge" sub-routine is also similar to that shown in FIG. 13 but with only traffic sourcing from sub-network Y that is also destined for sub-network Y being totalled in the steps corresponding to the steps 102 and 103.

It will be appreciated that since the sub-network traffic matrices are derived from statistical data, the various tests carried out on the data by the above-described routines and sub-routines take the full of hypothesis testing rather than straight comparisons.

Many variations can be made to the above-described topology discovery method. For example, the end or test for a bridge can be applied in respect of traffic from any particular station on the sub-network Y of a sub-network pair Y,X under consideration and the test can be repeated for traffic from each station on the sub-network Y. Furthermore, the traffic matrix data may be derived by the monitoring devices themselves and then passed to the processing station 13 at the end of the sampling period; in this case, the monitoring devices could record each and every packet rather than sampling the packets. Where only particular topology features are required or only particular tests are to be used, the provision of the full range of traffic information such as is contained in the sub-network traffic matrices is unnecessary. For example, where only the first test for a bridge is to be used and the source information contained in a packet indicates directly the originating sub-network, the monitoring devices can directly record how many packets are observed sourcing from a particular sub-network and this data can then be supplied to the Station 13 for immediate use in the "first test for a bridge" sub-routine (FIG. 13).

Figure 14:
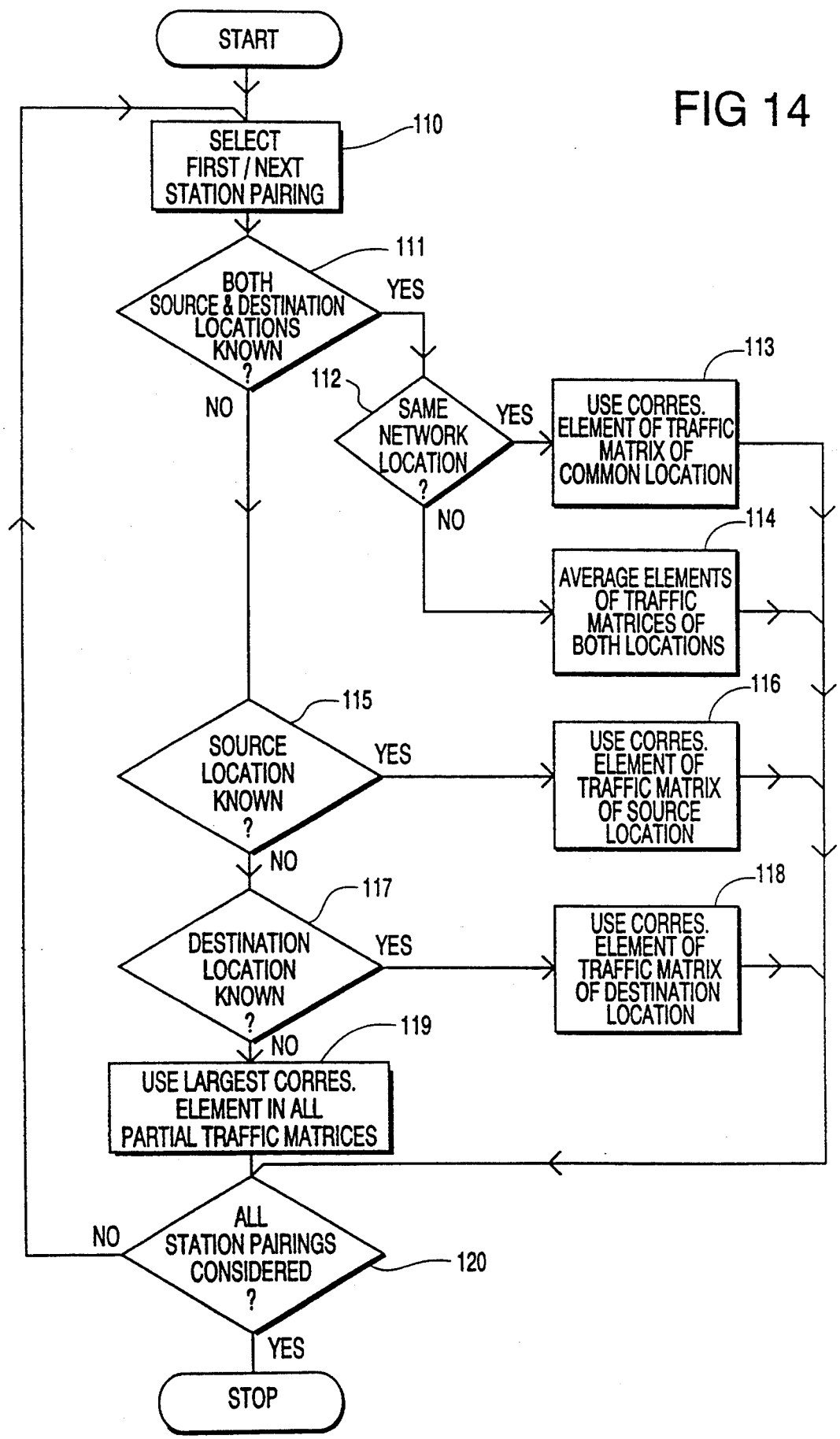
FIG. 14 is a flow chart illustrating the derivation of a site traffic matrix.

The derived partial traffic matrices can be used to obtain a site traffic matrix (that is, a traffic matrix for all sub-networks). FIG. 14 illustrates one method of deriving such a site traffic matrix and as will be explained below, this derivation is preferably effected using a knowledge of the sub-network location of each station, either as derived by the station allocation routine described above or as provided in some other manner (for example, from a network configuration database, or from bridges or routers). However, a knowledge of the location of each station is not essential.

Referring to FIG. 14, each source/destination station pairing is considered in turn (by virtue of the looped structure established by steps 110 and 120) and the corresponding entry in the site traffic matrix is then derived from the existing partial traffic matrices in a manner dependent on whether or not one or both of the source and destination station locations are known.

If the sub-network location of both the source and destination stations are known and are the same (steps 111, 112), then the entry for the site traffic matrix for this pairing of source/destination stations is taken as the corresponding entry in the partial traffic matrix for the sub-network on which both stations are commonly located (step 113). However, if the locations of both stations are known but are different, then the site traffic matrix entry for this station pairing is derived by averaging the corresponding entries in the partial traffic matrices for the sub-networks on which the stations are respectively located (step 114); because of the statistical nature of the entries in the partial traffic matrices when derived in the manner disclosed in the foregoing description, the averaging is of the form:

$$\text{averaged mean} = (m_1 + m_2)/2$$

$$\text{averaged variance} = (v_1 + v_2)/4$$

where $m_1$, $v_1$ are the relevant mean and variance entries in the source-station location partial traffic matrix and $m_2$, $v_2$ are the relevant mean and variance entries in the destination-station location partial traffic matrix.

If only the source station location is known (step 115), then the site traffic matrix entry is taken as the corresponding entry in the partial traffic matrix for the source station sub-network (step 116). Similarly, if only the destination station location is known (step 117), then the site traffic matrix entry is taken as the corresponding entry in the partial traffic matrix for the destination station sub-network (step 118).

If neither the source or destination station location is known, then the site traffic matrix entry is derived by identifying the maximum mean value for that station pairing to be found amongst all the sub-network traffic matrices, and then using the corresponding sub-network matrix entry for the site traffic matrix (step 119).

The above-described method of deriving a site traffic matrix can of course be used with partial traffic matrices derived by non-statistical methods as well as those derived statistically. Furthermore, derivation of the site traffic matrix can be effected independently of the station allocation and bridge identification tasks described above, particularly if station location information is separately available.

Although the above disclosed topology discovery method has been described in relation to an Ethernet-type network, it will be appreciated that it can also be applied to other networks, such as Internet network, to ascertain network topology features. The foregoing topology discovery method has been described in terms of data structures that can also be readily implemented using programming techniques appropriate when the programs and data are considered separately. It will be appreciated that the described method can also be implemented using techniques such as object-oriented programming. Thus, those skilled in the art will recognize that modification and variations may be made without departing from the principles of the invention as described herein above and set forth in the following claims.

What is claimed is:

1. A method of ascertaining topology features of a network using a processing system, the network comprising a plurality of sub-networks, spanning devices interconnecting the sub-networks, and stations operatively interconnecting the sub-networks, wherein at least some of said interconnections are not provided as inputs to said processing system, said network carrying message packets having source information indicative of a source from which said message packets had originated and destination information indicative of a destination to which said message packets are destined, said message packets being carried on and between said sub-networks and defining traffic carried on and between said sub-networks, said stations being operative to do at least one of i) transmit traffic to at least one sub-network, and ii) receive traffic from at least one sub-network, the method comprising the steps of:

monitoring the traffic on at least a number of said plurality of sub-networks to derive data relating to at least an amount of traffic carried on and between said number of sub-networks so monitored and source of the traffic carried on and between said sub-networks so monitored; and processing the data to determine topology features of the network that have not been provided as inputs to said processing system, said topology features including the interconnection of each station to at least one sub-network and the interconnection of sub-networks to each other and to each of the spanning devices.

2. The method according to claim 1, further comprising the steps of:

ascertaining to which sub-network a selected station is connected, wherein the source information serves to identify those stations from which the message packets originate, the monitoring step determining the amount of traffic originating from the selected station that is carried on each sub-network, the processing step determining the sub-network carrying a largest amount of traffic from the selected station, said sub-network defining the sub-network to which the selected station is connected thereto.

3. The method according to claim 2, further comprising the steps of:

ascertaining to which sub-networks the stations are connected, wherein the source information serves to identify those stations from which the message packets originate;

and repeating the step of claim 2 for each station with the monitoring step being carried out for substantially all stations concurrently.

4. The method according to claim 1, further comprising the steps of:

(a) providing association information enabling the source information to be used to identify whether the message packet having the source information originated from at least one station connected to a first sub-network (Y); and (b) said monitoring step being operative to monitor the traffic on a second sub-network (X) and on each sub-network of a group (R) of sub-networks comprising substantially all sub-networks other than the first and second sub-networks, thereby deriving data relating to the amount of traffic from at least one station connected to the first sub-network (Y) that is carried on the second sub-network (X) defining traffic $(T_1)_x$ and carried on the sub-networks of group (R) taken together defining traffic $(T_1)_R$, using the association information;

said processing step being operative to use the data to compare the amounts of traffic $(T_1)_x$ and $(T_1)_R$, the processing step determining whether one of the spanning devices is connected between the first sub-network (Y) and second sub-network (X) when the larger of the amounts of $(T_1)_x$ and $(T_1)_R$ is $(T_1)_x$.

5. The method according to claim 1, further comprising the steps of:

(a) providing association information enabling:

(i) the source information to be used to identify whether the message packet having the source information originated from at least one station connected to a first sub-network (Y); and (ii) the destination information to be used to identify whether the message packet has a destination for at least one station connected to one of the sub-networks other than a second sub-network (X); and (b) said monitoring step being operative to monitor the traffic on the second sub-network (X) and on each sub-network of a group (R) of sub-networks comprising substantially all sub-networks other than the first and second sub-networks, thereby deriving data relating to the amount of traffic from at least one station connected to the first sub-network (Y) and having a destination other than stations connected to the second sub-network (X) that is carried on the second sub-network (X) defining traffic $(T_2)_x$ and carried on the sub-networks of the group (R) taken together defining traffic $(T_2)_R$, using the association information;

said processing step being operative to use the data to compare the amounts of traffic $(T_2)_x$ and $(T_2)_R$, the processing step determining whether one of the spanning devices is connected between the first sub-network (Y) and the second sub-network (X) when the larger of $(T_2)_x$ and $(T_2)_R$ is $(T_2)_x$.

6. The method according to claim 1, wherein the spanning devices used in the network do not act perfectly to block message packets with a destination to one station connected to a different sub-network from passing through at least one of said spanning devices to the different sub-network, the method further comprising the step of:

(a) providing association information enabling:

(i) the source information to be used to identify whether the message packet having the source information originated from one of the stations connected to a first sub-network (Y); and (ii) the destination information to be used to identify whether the message packet having the destination information has a destination for one of the stations connected to the first sub-network (Y); and (b) said monitoring step being operative to monitor the the traffic on a second sub-network (X) and on each sub-network of a group (R) of sub-networks comprising substantially all sub-networks other than the first and second sub-networks, thereby deriving information indicative of the amount of traffic from one station connected to said first sub-network (Y) and having a destination to one station connected to the first sub-network (Y), that is carried on the second sub-network (X) defining traffic $(T_3)_x$ and carried on the sub-networks of group (R) taken together defining traffic $(T_3)_R$, using the association information;

said processing step being operative to use the data to compare the amounts of traffic $(T_3)_x$ and $(T_3)_R$, the processing step determining whether one of the spanning devices is connected between the first sub-network (Y) and the second sub-network (X) when the larger of $(T_3)_x$ and $(T_3)_R$ is $(T_3)_x$.

7. The method according to claims 4, 5 or 6, wherein said processing step derives the amount of traffic sourcing from the first sub-network (Y) that is carried on the sub-networks of the group (R) by adding together the traffic amount for each sub-network of the group (R) without regard to any duplication that results from the same message packet being monitored on more than one sub-network of the group.

8. The method according to claim 4, wherein said association information further enables the destination information to be used to identify the sub-network having the station to which the packet is destined connected thereto, said processing step deriving the amount of traffic sourcing from at least one station connected to the first sub-network (Y) that is carried on the sub-networks of the group (R) taken together, by performing the following steps:
 (a) determining an amount of sub-network traffic is from at least one station connected to said first sub-network (Y), that is also destined for at least one station connected to the first sub-network (Y) and for at least one station connected to said second sub-network (X), for each of the sub-networks of group (R), and
 (b) adding together the amounts of sub-network traffic so determined in step (a) of this claim 8 for substantially all the sub-networks of group (R).

9. The method according to claims 5 or 6, wherein the processing step derives a relevant amount of traffic sourcing from at least one station connected to the first sub-network (Y) that is carried by the sub-networks of group (R) taken together by performing the following steps:
 (a) determining for each sub-network of group (R), which sub-network traffic is from at least one station connected to the first sub-network (Y), that is also destined for at least one station connected to the first sub-network (Y) and for at least one station connected to the second sub-network (X), and
 (b) adding together the relevant sub-network traffic components so determined for substantially all the sub-networks of group (R).

10. The method according to claims 4, 5 or 6, wherein said association information further enables the source information to be used to identify from which station in the first sub-network (Y) the message packet including said source has originated, the monitoring and processing steps for determining whether one of the spanning devices is present between said first and second sub-networks (Y,X) being carried out in respect of traffic from each station connected to the first sub-network (Y) taken separately.

11. The method according to claims 4, 5, or 6, further comprising the step of:
 ascertaining whether two sub-networks of a network are directly connected by a bi-directional spanning device, wherein steps (a) and (b) of each of the respective claims 4, 5 or 6 are repeated for traffic from at least one station connected to each of the two sub-networks.

12. The method of claims 4, 5, or 6 wherein steps (a) and (b) of each of the respective claims 4, 5 or 6 are carried out for a pairing of a set of sub-networks for substantially all sub-networks of the network or the portion thereof under consideration, thereby determining which of the sub-networks are interconnected by spanning devices.

13. The method according to claim 1, wherein said monitoring step involves the generation of traffic matrices for each sub-network.

14. The method according to claim 1, wherein said monitoring step involves sampling the traffic carried on the sub-networks, said processing step effecting its determination by using hypothesis testing.

15. The method of claim 1, wherein said step of monitoring the traffic to derive data relating to the amount and source of the traffic does not suspend i) the transmission of message packets to any station, and ii) the reception of message packets from any station.

16. The method of claim 1, wherein said step of monitoring the traffic to derive data relating to the amount and source of the traffic does not involve special message packets dedicated to providing information related to the topology features of the network such that the special message packets are carried solely between spanning devices.

* * * * *